July 22, 1952

F. J. VILLFORTH, JR
INTERNAL-COMBUSTION ENGINE AND
FUEL INJECTION NOZZLE THEREFOR

Filed March 25, 1947

INVENTOR.
FREDERICK J. VILLFORTH, JR
BY
ATTORNEY

July 22, 1952 — F. J. VILLFORTH, JR — 2,604,086
INTERNAL-COMBUSTION ENGINE AND
FUEL INJECTION NOZZLE THEREFOR
Filed March 25, 1947 — 3 Sheets-Sheet 2
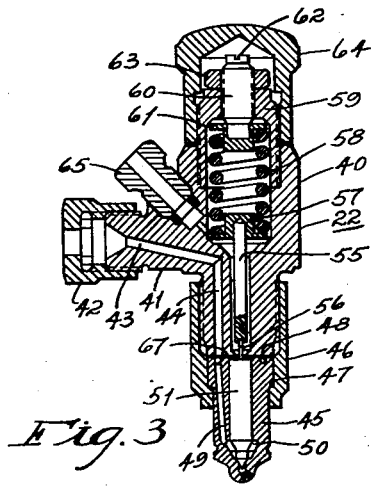
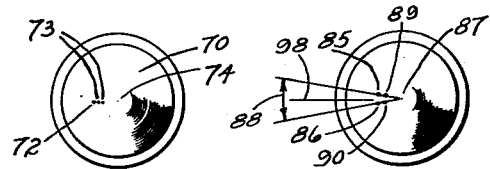
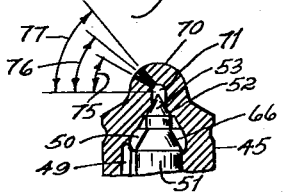
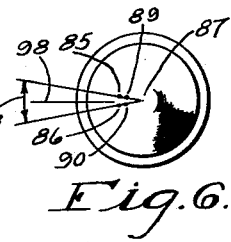
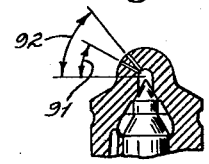
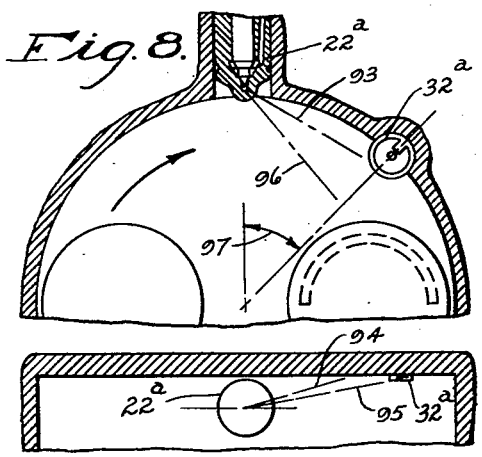
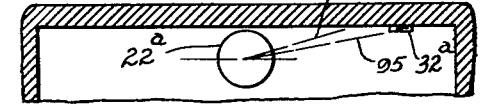
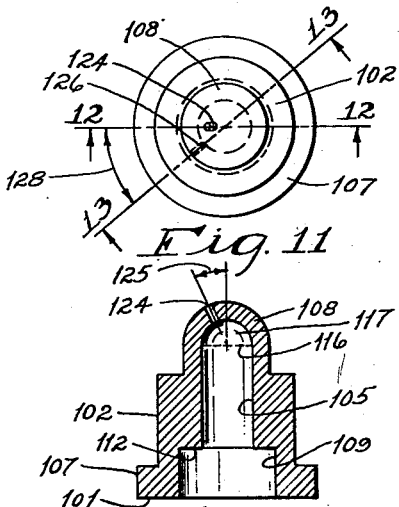
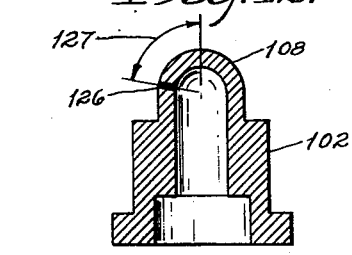
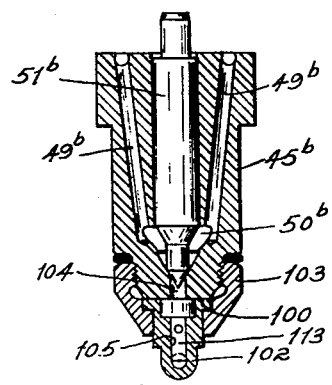
INVENTOR.
FREDERICK J. VILLFORTH, JR.
BY
ATTORNEY

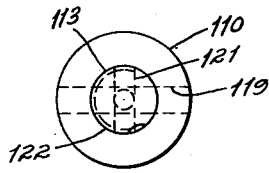
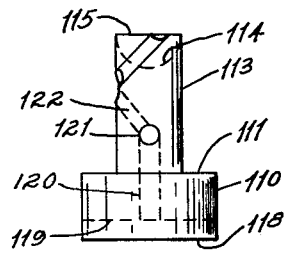
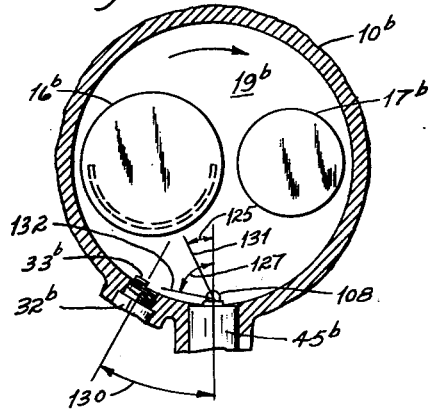
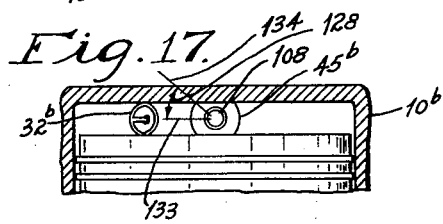
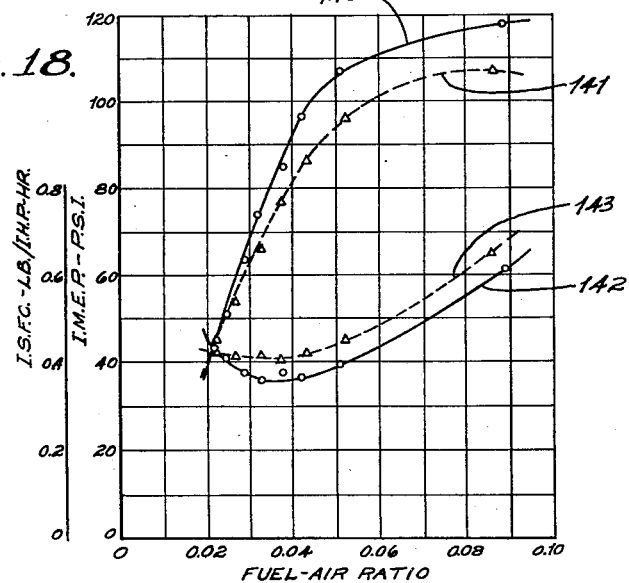

Patented July 22, 1952

2,604,086

UNITED STATES PATENT OFFICE 2,604,086

INTERNAL-COMBUSTION ENGINE AND FUEL INJECTION NOZZLE THEREFOR

Frederick J. Villforth, Jr., Beacon, N. Y., assignor to The Texas Company, New York, N. Y., a corporation of Delaware Application March 25, 1947, Serial No. 736,959

6 Claims. (Cl. 123—32)

This invention relates to a fuel-injection spark-ignition internal-combustion engine, wherein the combustion phase is independent of the spontaneous ignition quality of the fuel employed and knocking of the engine is prevented; and to a fuel injection nozzle for such an engine.

In the copending application of Everett M. Barber, Serial No. 10,598 filed February 25, 1948, now Patent No. 2,484,009 dated October 11, 1949, which is a continuation-in-part of Serial No. 513,232, filed December 7, 1943, now abandoned, there is disclosed and claimed an engine of this character wherein fuel is injected into rapidly swirling compressed air in the cylinder combustion space toward the latter part of the compression stroke, the first increment of injected fuel is spark-ignited substantially as soon as a combustible fuel vapor-air mixture is formed therefrom to establish a flame front traveling counter to the direction of the air swirl, and the injection of fuel is continued into the swirling compressed air immediately in advance of the traveling flame front to progressively form additional combustible fuel vapor-air mixtures which are ignited by the traveling flame front and burned substantially as rapidly as formed. In a specific embodiment disclosed and claimed therein, fuel is injected tangentially into the combustion space in the direction of air swirl, and spark ignition of the first increment of injected fuel is secured by a spark plug mounted adjacent to the injection nozzle and close to the periphery of the combustion space so as to be positioned at an edge of the spray form and in the region of diffusing fuel vapor-air mixture first produced therefrom.

In the engine of the above-mentioned application, one fuel spray is required to effect both immediate ignition at an edge of the first increment of that spray and also uniform impregnation of the compressed air swirling past the locus of injection at one side of the combustion space. It has been found that the requirements for a spray which will rapidly produce a combustible mixture close to the nozzle for immediate ignition, and the requirements for a spray which will uniformly impregnate the swirling air across one side of the combustion space are different, and, in some particulars, opposed to each other. Consequently, the use of a single spray for both functions necessitates a comprise between the most desirable types for the separate requirements. Also, with injection from a nozzle positioned with the tip adjacent to the periphery of the combustion space and having a single drilled hole spray port, it has been found that there is a particular angular direction of injection across a chord of the combustion space into the air swirling past the locus of injection which produces maximum power with reduced fuel consumption. However, this angular direction is frequently such as to cause the edge of the spray to miss the electrodes of the spark plug with resultant misfiring and knocking. Here again, a compromise is necessitated to insure ignition on each cycle, but with resultant loss in power and increased fuel consumption.

It is accordingly a principal object of the present invention to provide a non-knocking engine of the general character disclosed in said application Serial No. 10,598, wherein the separate requirements for ignition of the first increment of injected fuel immediately after the start of injection, and for the uniform impregnation of the swirling air moving past the locus of injection on one side of the combustion space, are met in optimum manner by the use of a coordinated pilot spray for ignition and at least one main spray for uniform impregnation.

Another object of the present invention is to provide an engine of this type, wherein the angular relationships between the pilot spray and the main spray or sprays can be readily correlated to insure ignition and at the same time provide increased power with reduced fuel consumption.

Still another object of the invention is to provide an improved fuel injection nozzle for an engine of this character, which is simple in construction, reliable in operation, has long life, and enables the pilot and main spray ports to be readily positioned and directed with respect to the swirling air on one side of the combustion space and the adjacent spark plug, so as to secure the desired efficient non-knocking operation.

Other objects and advantages of the invention will be apparent from the following description when taken in conjunction with the appended claims and the attached drawing.

The present invention is distinguished from that of the above-mentioned application by initiation of fuel injection on each cycle with at least two jets in slightly different angular relationship, but in the same general direction on one side of the combustion space. These jets include a smaller non-flaring pilot jet directed close to the locus of spark ignition, and at least one larger flaring main jet alongside of said pilot jet and contiguous thereto for uniform impregnation of the swirling air moving past the locus of injection on said one side of the combustion space. The combustible fuel vapor-air mixture formed from the first increment of injected fuel of the pilot jet is promptly spark-ignited to produce a flame which then spreads across the main jet mixture to establish the flame front across said one side of the combustion space and which travels counter to the direction of air swirl. Injection is then continued on each cycle from said pilot and main jets immediately in advance of the traveling flame front to develop the power required.

In a preferred embodiment of the invention, the pilot jet is injected across a small chord of the combustion space adjacent to the periphery thereof in the direction of air swirl, and the main jet or jets are also injected in the general direction of air swirl, but more toward the center of the combustion space, so as to substantially uniformly impregnate the swirling air between said pilot jet and the center of the combustion space. In addition to the larger angle between the jets in a plane extending across the combustion space at right angles to the cylinder axis, there may be a smaller angle between the pilot and main jets in a plane parallel to the cylinder axis, so that at least one of the jets, for example, the pilot jet, is inclined upwardly to impinge upon the cylinder head before reaching the locus of ignition.

For this purpose, a fuel injection nozzle is provided with a novel tip assembly having a hemispherical or bulbous portion formed with a fuel passage beyond the pintle valve, together with at least two drilled holes on the same side of the curved side wall of the bulbous portion. The drilled holes are of different diameter and have different length-to-diameter ratios to provide pilot and main spray jets of the required characteristics. The pilot port is located farther from the apex of the bulbous portion than the main port to produce the required angular directions and relationships of the contiguous sprays on one side of the combustion space.

The use of a plurality of sprays, one of which is termed an "ignition spray," in an engine of the Hesselman type having swirling air and spark-ignition with Otto cycle combustion, has been proposed. However, in this case the sprays are directed in different directions so as to be dispersed in widely different parts of the combustion space and injection is complete, or substantially complete, prior to ignition. Also, the use of pilot injection has heretofore been proposed in diesel engines operating with compression-ignition, as well as in semi-diesels operating with a spark plug to reduce ignition lag; but here again, the various sprays have been directed to widely separated portions of the combustion space. The present invention is distinguished by the characteristic flame front combustion of Otto cycle engines taking place during most of the injection period on each cycle, together with the particular relationship and arrangement of the pilot and main sprays and also the spark plug at one side of the main disc-shaped combustion space containing swirling air, with the new result of accomplishing non-knocking combustion in a more efficient manner to provide increased power with reduced fuel consumption.

Referring to the drawing, which discloses preferred embodiments of the present invention:

Fig. 3 is a vertical sectional view of the fuel injection nozzle of Figs. 1 and 2;

Fig. 4 is an enlarged plan view looking upwardly on the nozzle tip of Fig. 3;

Fig. 5 is an enlarged vertical sectional view through the nozzle tip of Fig. 4;

Figs. 6 and 7 are views coresponding to Figs. 4 and 5 of another form of nozzle tip;

Fig. 8 is a partial horizontal sectional view, and Fig. 9 is a partial vertical sectional view (omitting the valves), of an engine cylinder illustrating the operation with the nozzle tip of Figs. 6 and 7;

Fig. 10 is a vertical sectional view through another form of nozzle tip assembly;

Fig. 11 is an enlarged plan view looking upwardly on the nozzle tip of Fig. 10;

Figs. 12 and 13 are enlarged vertical sectional views taken on the planes of the lines 12—12 and 13—13, respectively, of Fig. 11;

Figs. 14 and 15 are plan and elevational views respectively of a swirl insert adapted to be removably mounted within the nozzle tip of Figs. 10–13;

Figs. 16 and 17 are horizontal and vertical sectional views respectively corresponding to Figs. 8 and 9, illustrating the mounting of the nozzle of Figs. 10–15 in an engine cylinder; and Fig. 18 is a graph illustrating engine performance characteristics of the present invention in comparison with those of the same engine equipped with a single hole nozzle.

Figure 1:
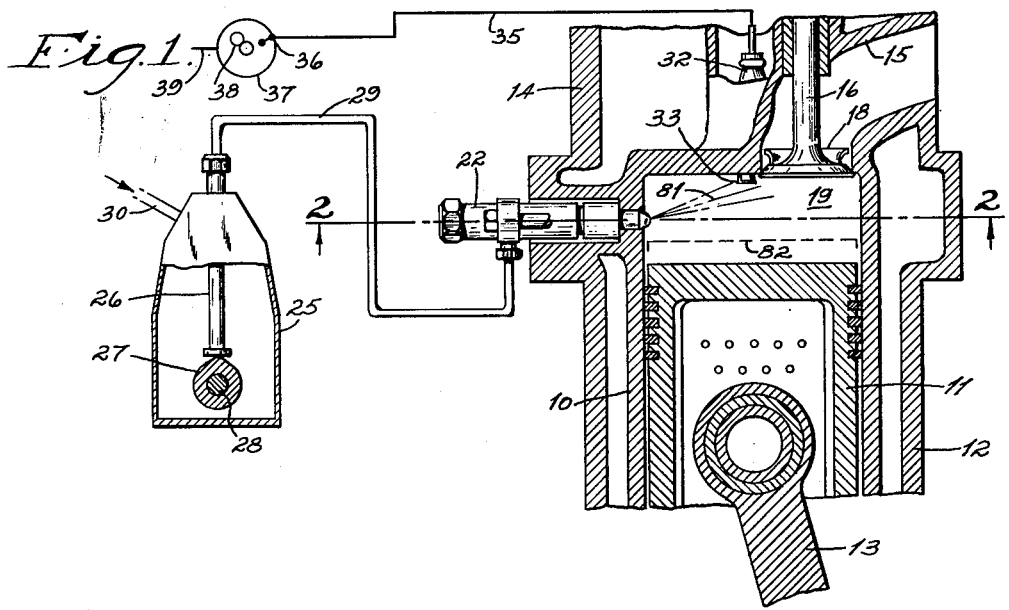
Fig. 1 is a vertical sectional view of an engine cylinder taken on the plane of the line 1—1 of Fig. 2, with appurtenances illustrated diagrammatically and primarily in elevation.
Figure 2:
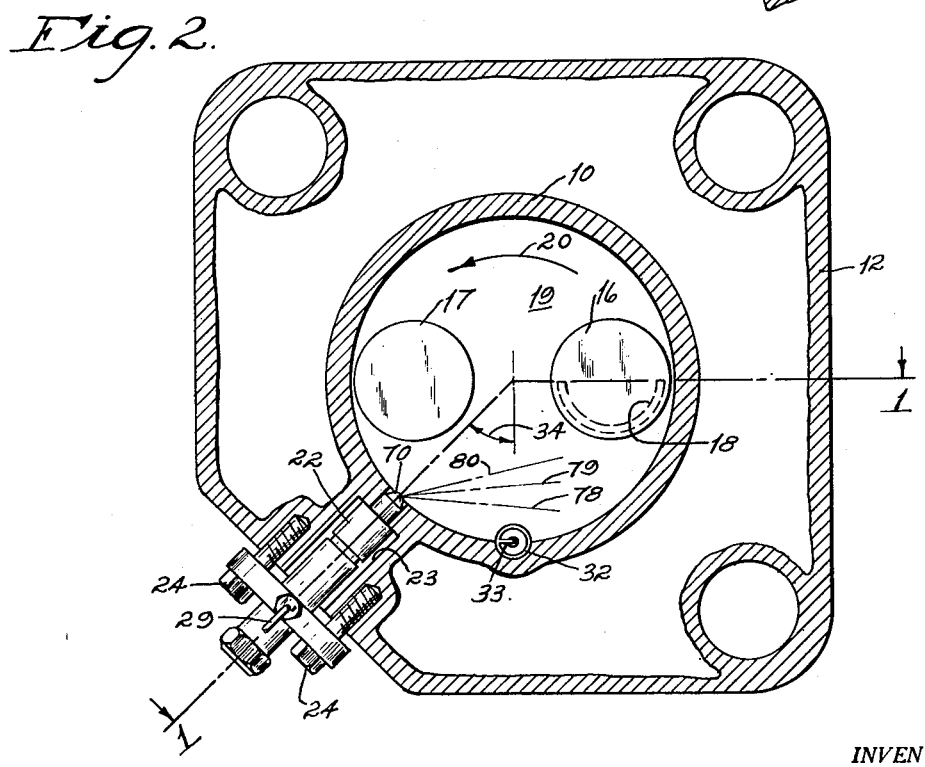
Fig. 2 is a horizontal sectional view looking upwardly on the cylinder head and taken on the plane of the line 2—2 of Fig. 1.

Referring to Figs. 1 and 2, the engine cylinder is indicated at 10 with piston 11, water jacket wall 12, and connecting rod 13 which runs to the usual crankshaft, not shown. The cylinder head 14 is formed with an air intake port 15 controlled by an intake valve 16, and a similar exhaust port controlled by an exhaust valve 17. The intake valve 16 is equipped with a shroud 18, which is set to direct the air tangentially, so that on the suction stroke of piston 11, air is drawn into the disc-shaped combustion space 19 in a manner to impart a swirling movement of high velocity to this air within the combustion space, as indicated by the arrow 20 (Fig. 2). This high velocity air swirl is maintained during the compression stroke of piston 11.

Generally about 75 to 30° before top dead center, injection of fuel is initiated from injection nozzle 22 fastened by bolts 24 within a radial bore 23 in the side wall of cylinder 10. Fuel injection is controlled by the usual fuel pump 25 having a plunger 26 operated by a cam 27 on a cam shaft 28, which is driven in synchronism with the engine at one-half engine speed for four-cycle operation in conventional manner. It will be understood that fuel pump 25 controls the time and duration of injection by supplying the fuel under high injection pressure to injection line 29 leading to nozzle 22 during the pumping stroke of plunger 26, the latter controlling communication of a feed port supplied with fuel from line 30 leading from a suitable source of supply (not shown), with either a discharge port communicating with line 29 or a spill port (not shown) which returns the fuel to the source of supply. Consequently, fuel is supplied through injection line 29 to nozzle 22 under high injection pressure during the injection period on each cycle, and thereafter the high injection pressure is relieved in said line 29 and nozzle 22.

A spark plug 32 is mounted in the cylinder head 14 so that the electrodes 33 protrude just below the surface of the head at the top of the combustion space 19 (Fig. 1), and adjacent the periphery thereof (Fig. 2). The spark plug is on the air down-stream side of nozzle 22 and is so located that the electrodes 33 are positioned within a central angle, indicated by the arrow 34, of about 20–90° and, preferably, about 30–45°, as formed by radii passing through the nozzle tip and the electrodes, respectively. As shown diagrammatically in Fig. 1, electrical lead 35 is connected to contact 36 of a conventional distributor 37 having a rotary contact member 38 driven in synchronism with the engine. It will be understood that the distributor is part of a conventional ignition system including lead 39, whereby the timing of spark-ignition can be controlled and synchronized with the timing of fuel injection on each cycle. In this manner a spark of igniting intensity is present at electrodes 33 approximately 4 to 10 crank-angle degrees following the start of fuel injection, at which time combustible fuel vapor-air mixture from the first increment of injected fuel has reached the electrodes 33, as more particularly described hereinafter.

The construction of fuel injection nozzle 22 is more particularly illustrated in Fig. 3. As shown, this comprises a body member or injector 40 having a side boss 41 which threadedly receives a coupling 42 to which the fuel line 29 is connected. The boss 41 is drilled to provide a fuel channel 43 which communicates at its inner end with a downwardly extending fuel channel 44 drilled in the body member 40.

The nozzle also comprises a tip assembly, including a tip member 45, held in engagement with the lower end of body member 40 by a coupling 46 threadedly received by exterior threads on the body member and engaging a shoulder 47 on tip member 45. The upper surface of tip member 45 is formed with an annular groove 48, which registers with the lower end of fuel channel 44. The groove 48 communicates in turn with a fuel passage 49 drilled in the tip member 45.

Referring particularly to Figs. 3 and 5, the tip member is formed with an enlarged fuel pressure chamber 50 communicating with the lower end of fuel passage 49. Tip member 45 is also provided with an axial bore slidably receiving a pintle valve 51. At the inner end of pressure chamber 50 the tip member is formed with a conical valve seat 52 adapted to cooperate with a conical seating surface 53 formed on pintle valve 51.

Again referring to Fig. 3, body member 40 is also formed with an axial bore slidably receiving a stem 55 which bears at its lower end in loose-fitting engagement with the upper end of a pin 56 carried by pintle valve 51. The upper end of body member 40 is cup-shaped to receive a spring retainer 57 bearing on the upper end of stem 55, and a compression spring 58 whose lower flattened end engages a shoulder of spring retainer 57. An enlarged bore at the extreme upper end of the cup portion of body member 40 is interiorly threaded to receive a sleeve member 59 which surrounds the upper end of compression spring 58. The upper end of sleeve member 59 has an interiorly threaded bore which receives the compression adjusting member 60 bearing at its lower end against upper spring retainer 61, which in turn bears against the upper flattened end of compression spring 58. The upper end of adjusting member 60 is formed with a slot 62 for the receipt of a screw driver, by means of which the member 60 can be threaded in or out to adjust the compression in spring 58. The parts are locked in adjusted position by a nut 63 threaded on member 60 and seating against the upper surface of sleeve 59. The entire upper assembly is enclosed by a cover cap 64 which is threadedly received by exterior threads on sleeve 59 and adapted to seat against the upper surface of body member 40. The latter also threadedly receives a leakage coupling 65 adapted to be connected to a return line (not shown) to thereby return any fuel leaking past the pintle valve to the source of supply. The opening movement of pintle valve 51, in response to fuel pressure in chamber 50 acting on the conical surface 66 of the valve and overcoming the compression of spring 58, is limited by engagement of the upper end of pintle valve 51 with a shoulder 67 at the lower end of body member 40.

In accordance with the present invention, and as more particularly illustrated in Figs. 4 and 5, the inner end of tip member 45 beyond valve seat 52 is formed as a hemispherical or bulbous extension 70 with an interior fuel channel or passage 71. Drilled through the curved side wall of the bulbous extension 70 are a plurality of spray ports, shown as three in number. These include a pilot port 72 of smaller diameter and of larger length-to-diameter ratio, and two main spray ports 73, at least one of which is of larger diameter and smaller length-to-diameter ratio. Since the pilot port 72 is located farther from the apex 74 of the bulbous extension 70, it will be seen that this port is directed at the smallest angle indicated by the arrows 75 with respect to a plane normal to the axis of the nozzle, and consequently making the greatest angle with respect to the longitudinal axis of the nozzle. The main spray ports 73 being progressively closer to the apex 74 thus have longitudinal axes which make progressively greater angles, indicated by the arrows 76 and 77, respectively, with the plane normal to the nozzle axis. As shown in Fig. 4, all the ports 72—73 lie within a single plane represented by a radius of the nozzle tip.

Referring again to Figs. 1 and 2, the nozzle of Figs. 3–5 is mounted in the engine cylinder with the bulbous portion 70 barely protruding into the combustion space 19, and with the ports 72—73 facing down-stream or in the general direction of spark plug 32. The angularity of the ports is such as to produce a pilot jet, whose center line is indicated at 78 in Fig. 2, which passes closest to the electrodes 33 of spark plug 32. In view of the relatively small diameter and the relatively large length-to-diameter ratio of this pilot port 72, the resulting pilot jet 78 is a non-flaring pencil type of jet whose direction in the short intervening travel between the nozzle tip and the spark plug can be accurately controlled. This type of jet is directed so that the outer edge thereof just misses the spark plug, while the action of the swirling air strips off the outer layers of the jet, rapidly forming a combustible fuel vapor-air mixture therefrom and diverting it into contact with electrodes 33.

On the other hand, a main spray port 73, being of larger diameter and smaller length-to-diameter ratio, produces a flaring jet. The directional center lines of the two main jets 73 are indicated in Fig. 2 by the numerals 79 and 80, respectively. These jets are directed more toward the center of the combustion space but are nevertheless concentrated toward the periphery to provide increased quantities of fuel for the outer portions of the swirling mass of air where the volume of the latter is greater. Also, due to the flaring characteristics and lower penetration, these jets are rapidly picked up by and mixed with the swirling air to form combustible mixtures contiguous to that formed from the pilot jet and extending substantially across one side of the combustion space by the time they reach the location represented by the radius passing through the spark plug 32, which is the locus of ignition and of the flame front. Consequently, when the first increment of injected fuel of the pilot jet 78 in combustible mixture form reaches the electrodes 33, ignition is assured to establish a flame; at the same time, the region between the electrodes and the center of the combustion space is also substantially filled with combustible mixture, so that the flame rapidly spreads across this mixture and establishes the traveling flame front moving counter to the direction of air swirl. Thereafter, injection is continued with the pilot and main jets immediately in advance of the established flame front to develop the power required, and the progressively formed combustible mixture is ignited by the flame front and burned substantially as rapidly as produced.

In the particular embodiment shown in Figs. 1–5, with the electrodes 33 positioned adjacent to the upper portion of combustion space 19, and the pilot and main spray ports 72—73 arranged in a line as shown in Fig. 4, nozzle 22 is preferably mounted with the ports 72—73 inclined upwardly at a slight angle, as illustrated in Fig. 1. This is accomplished by turning the bulbous tip 70 so that the radius containing ports 72—73 is upwardly inclined at a small angle from the horizontal, which latter is the position shown in Fig. 4. The center line of all three jets may then be that indicated by the numeral 81 in Fig. 1, which is sufficiently inclined to cause the jets to contact the cylinder head 14 prior to or about the time they reach the locus of ignition. However, due to the flaring characteristics of a main jet 73, the fuel will also spread out conically to more uniformly impregnate the swirling air throughout the depth of the combustion space 19, particularly that portion above the top dead center position of piston 11 indicated by the dotted line 82 in Fig. 1.

While in the specific embodiment illustrated, two main spray ports 73, in addition to the pilot port 72, are provided, this is not essential. For example, one main spray port designed to secure the flaring and softer type of jet for uniform impregnation, may be used with one pilot jet, or with several outer jets of smaller diameter. By way of specific example, very satisfactory operation was secured with a modified C. F. R. engine, wherein a nozzle tip of the type illustrated in Figs. 4 and 5 was mounted at the periphery of the combustion space in a radial bore, with the spark plug 32 located as illustrated in Fig. 2 at a central angle 34 or 45° from the nozzle. The outer pilot port 72 was .006 inch in diameter and had a length-to-diameter ratio of about 16.7. The inner main spray port 73 was .010 inch in diameter and had a length-to-diameter ratio of about 10. The middle port 73 had the same dimensions as the pilot port. The angles 75, 76 and 77 of Fig. 4 were respectively 30°, 40° and 50°. The nozzle tip was also inclined, so as that the radius passing through the ports of the bulbous portion, as shown in Fig. 4, made an angle of 45° with the horizontal plane of the combustion space whereby all the ports were inclined to impinge on the cylinder head before reaching the locus of injection.

Figs. 6 and 7 illustrate a modification of the nozzle tip assembly, which has also been employed. The construction is similar to that of Figs. 4 and 5, except for a different arrangement of ports. In this case, two pilot ports, 85 and 86, were provided at the same distance from the apex 87 of the bulbous portion. The said ports 85 and 86 were spaced angularly about the curved side wall through a small central angle indicated by the arrows 88. In addition, two main spray ports, 89 and 90 were drilled closer to the apex 87, and the same distance therefrom. Ports 89 and 90 were angularly spaced by the same central angle 88 so that ports 85 and 89 would lie on one radius and ports 86 and 90 on another radius of the tip. The distance of the pilot ports 85 and 86 from the apex was such as to give a smaller angle of divergence from a plane normal to the longitudinal axis of the nozzle, as shown by the arrow 91 in Fig. 7; while the main spray ports 89 and 90 had a larger angle of divergence, as shown by the arrows 92. Here again, the pilot ports were constructed of smaller diameter and larger length-to-diameter ratio; and the main spray ports were of larger diameter and smaller length-to-diameter ratio.

The nozzle 22a was mounted in a radial port at the periphery of the engine cylinder, as shown in Fig. 8, with the four spray ports on the same side of the nozzle tip facing generally downstream and toward the spark plug 32a, also located at the periphery of the combustion space. The angle of divergence 91 for the pilot ports 85 and 86 was such as to produce sprays having the general direction of the center line 93 in Fig. 8; thus passing across a small chord of the combustion space adjacent to the periphery thereof and toward the spark plug 32a. At the same time, the nozzle tip was turned so as to incline the ports upwardly toward the cylinder head at a slight angle, with the result that the angle of inclination 88 (Fig. 6) produced pilot sprays having the general direction of the central lines 94 and 95, as shown in Fig. 9. One pilot spray was thus directed generally toward the electrodes of plug 32a, while the other spray was inclined at a greater angle to impinge on the cylinder head before reaching the locus of ignition. The angle of divergence 92 of the main spray ports 89 and 90 produced sprays having the general direction in horizontal plane of the center line 96 in Fig. 8; while the angle of inclination of these main sprays was the same as for the pilot sprays, as indicated by the center lines 94 and 95 in Fig. 9. However, it will be appreciated that the main sprays were flaring in character, so as to uniformly impregnate the mass of swirling air between the pilot sprays and the center of the combustion space as that air moved past the locus of injection.

In the specific embodiment just described, employing again a modified C. F. R. engine having a central angle 97 (Fig. 8) between the nozzle and the spark plug of 45°, the pilot ports 85 and 86 each had a diameter of .006 inch with a length-to-diameter ratio of about 16.7; and the main spray ports 89 and 90 each had a diameter of .010 inch with a length to diameter ratio of about 10. The angles of divergence 91 and 92

(Fig. 7) were 30° and 50°, respectively. The central angle 88 (Fig. 6) between the two sets of ports was 20°, and the nozzle tip was turned to incline the center line 98 (Fig. 6) at an angle of approximately 20° with respect to the horizontal plane of the combustion space so as to provide inclination of the jets, as illustrated at 94—95 in Fig. 9.

This modification illustrates another feature of the present invention, which is the inclination of the respective jets at slightly different angles, so that at least one pilot jet impinges on the cylinder head in advance of the locus of ignition, while at least one main jet is directed in a more nearly horizontal direction of the combustion space. Here again, all the jets are on the same curving side of the bulbous tip. It may be stated that the angle 88 between the respective jets is usually less than about 45°. While in the foregoing specific embodiment, plural pilot jets and plural main jets were employed, this is not essential, as is illustrated by the third embodiment of Figs. 10–17, which has also been employed with very satisfactory results.

In the nozzles previously described, the tip portion 70 containing the fuel passage 71 and the spray ports, is shown as integral with the body portion 45. However, this is not essential and the bulbous tip portion can be conveniently constructed as a separate and replaceable element. In the description and claims, the expression "tip assembly" is used herein to designate the complete inner portion of the nozzle, including the member 45, pintle valve 51 and bulbous extension 70 irrespective of whether or not the bulbous extension 70 is formed integrally with member 44 or as a separate piece. The latter type of construction is illustrated in Fig. 10, which is a view corresponding to Fig. 3 of the tip assembly 45—51 only, the injector or body portion 40, with clamping member 46, being removed. In Fig. 10, the body portion of the tip member is indicated at 45b, with two fuel passages 49b, fuel pressure chamber 50b and pintle valve 51b. The inner end of the body portion 45b is provided with a machined seating surface 100 adapted to engage in seating relationship a complementary seating surface 101 of a replaceable bulbous tip 102 held in place by a clamping ring 103. The inner end of body portion 45b beyond the pintle valve is formed with an axial fuel passage 104, which is in communication with an axial bore 105 formed in the bulbous tip 102.

The construction of the element 102 is more particularly illustrated in enlarged scale in Figs. 11–13. As shown, this comprises a nipple having at one end a flange 107 adapted to be engaged by the clamping ring 103, and providing the machined surface 101 previously described. The end of the nipple is formed with a hemispherical or bulbous portion 108, through which the spray ports are drilled. The inner end of the member 102, including bulbous portion 108, is provided with the bore 105 previously described. The outer end adjacent flange 107 is formed with an enlarged bore 109.

Mounted within the bores 109 and 105 is the swirl insert illustrated in Figs. 14 and 15. This comprises an outer cylindrical portion 110 of enlarged diameter adapted to be received within bore 109, with shoulder 111 seating against the annular flange 112 of member 102. The insert also comprises a cylindrical extension 113 of smaller diameter adapted to be received within the bore 105.

The inner end of extension 113 is formed with a hemispherical cavity 114; and the length of extension 113 is so proportioned with respect to the length of bore 105 that the peripheral surface 115 of the extension falls on the diameter indicated by the dotted line 116 in Fig. 11, so that a spherical cavity or fuel chamber 117 remains at the inner end of the bulbous extension 108.

When the insert is positioned within member 102, the outer end 118 of the insert is substantially flush with the surface 101 (Fig. 12) whereby the clamping ring 103 (Fig. 10) holds the parts in assembled relationship. The outer end 118 of the insert is formed with a diametrical slot 119 which communicates with fuel passage 104 (Fig. 10) in body member 45b. The insert is also provided with an axial bore 120 communicating at its outer end with slot 119 and at its inner end with a diametrical bore 121 drilled through extension 113. Extending along the side wall of extension 113 from one end of bore 121 is a spiral channel 122 terminating at the peripheral surface 115. Consequently, fuel passing beyond pintle valve 51b, through passages 104, 119—121, and spiral channel 122, is given a rapid swirling movement as it enters the spherical chamber 117. While the particular form of insert illustrated constitutes a very satisfactory and economical construction, it will be understood that any suitable form of insert providing a swirling movement to the fuel immediately prior to its discharge through the injection ports, can be employed.

Referring again to Figs. 11–13, bulbous tip 108 is formed with a main spray port 124 of relatively large diameter and relatively small length-to-diameter ratio, said port being drilled at a relatively small pitch angle, indicated by the arrows 125, from the longitudinal axis of the nozzle tip. In addition, bulbous tip 108 also has drilled through the same curving side wall a pilot port 126 of relatively smaller diameter and relatively larger length-to-diameter ratio, said port having a much larger pitch angle, indicated by the arrows 127 in Fig. 13. While the ports 124 and 126 are on the same general side of the bulbous tip 108, as shown more clearly in Fig. 11 these ports are angularly displaced about the tip by an angle of inclination, indicated by the arrows 128.

The mounting of the nozzle of Figs. 10–15 in the engine cylinder is illustrated in Figs. 16 and 17. As shown therein, the nozzle with the body portion 45b is mounted in a radial bore of the cylinder 10b with the bulbous tip 108 slightly protruding into the periphery of the combustion space 19b. This cylinder is provided with an enlarged intake valve 16b and a relatively smaller exhaust valve 17b to provide increased volumetric efficiency for the intake of swirling air. The spark plug 32b, with electrodes 33b barely protruding into the periphery of the combustion space, is also mounted in a radial port in the side wall of cylinder 10b on the approximate horizontal plane of the fuel nozzle, and relatively close to the nozzle on the down-stream side providing a small central angle indicated by arrows 130 (Fig. 16). The nozzle tip is positioned with the main port 124 and the pilot port 126 on the air down-stream side facing the spark plug, the pitch angles 125 and 127, respectively, of these ports being such as to direct the main flaring jet in the direction indicated by the center line 131 (Fig. 16), and the non-flaring pilot jet in the direction indicated by the center line 132. At the same time the angle of inclination 128 between the jets is such that, when the main jet is directed substantially horizontally of the combustion space, as indicated by the center line 133 (Fig. 17), the pilot jet is inclined upwardly, as indicated by the center line 134, to impinge on the cylinder head in advance of the spark plug.

By way of specific example, and as illustrating the advantages of the present invention with respect to improved power and reduced fuel consumption, a modified International truck engine cylinder of 4⅛" diameter bore and 4½" stroke, constructed in accordance with Figs. 16–17, with the central angle 130 between the nozzle and spark plug being 30°, was operated in comparative runs with the swirl type nozzle of Figs. 10–15 having both pilot port 126 and main port 124, and then under comparable conditions with a swirl type nozzle of similar construction except that the tip was provided with a single spray port. The construction and mounting of the two nozzles is shown in the following table:

TABLE I

*Swirl type pilot spray nozzle*

Main spray port—.020" D.:
  Pitch angle 125 _____ 25°
  Flaring spray having cone angle of 45°
    and penetration 2" in still air.
  Length-to-diameter ratio _____ 5
Pilot spray port—.006" D.:
  Pitch angle 127 _____ 80°
  Angle of inclination 128 _____ 40°
  Length-to-diameter ratio _____ 16.7

*Swirl type single hole nozzle*

Single spray port .020" D.
  Flaring spray having cone angle of 60°
    and penetration of 1":
  Pitch angle 125 _____ 30°

The conditions of engine operation employed in the comparative tests were:

TABLE II

Engine R. P. M., 1800
Compression ratio, 10
Manifold pressure, 30" Hg absolute
Manifold temp., 90° F.
Air consumption, 110 lbs./hr.
Fuel employed, gasoline of 20 octane number and 18,900 B.t.u./lb.
Injection advance, 52° B. T. C.
Spark advance, 46° B. T. C.
Injector valve opening pressure 2000 lb./in.²

Fig. 18 is a graph plotting the results of these comparative runs. As shown, fuel-air weight ratio is plotted as abscissa against indicated mean effective pressure in pounds per square inch as ordinates in the upper curves, and with indicated specific fuel consumption in pounds per indicated H. P. per hour as ordinates in the lower curves. The full line 140 of the upper curve was obtained with the pilot spray nozzle of the present invention, while the dotted line 141 was obtained with the single hole nozzle, thus showing about a 10% increase in power. The solid line 142 of the lower curve was obtained with the pilot spray nozzle, and the dotted line 143 with the single hole nozzle, thus showing an appreciable improvement or economy in fuel consumption with concomitant power increase. Moreover, it should be pointed out that the single hole nozzle could not be given a smaller pitch angle 125 than about 30°, since operation of this nozzle with a pitch angle of 25° produced knocking, indicating that the edge of the spray was missing the spark plug with resultant misfiring, even though this nozzle was specifically selected to give a large flare or cone angle to the spray.

The foregoing results show that the present invention, with the coordinated and contiguous pilot and main sprays on the same side of the combustion space, enables the non-knocking combustion to be accomplished with increased power and reduced fuel consumption. It will be appreciated that the nozzle tip assemblies of the present invention enable the characteristics, with respect to flare and penetration of the sprays, to be independently selected for the pilot spray to insure ignition and for the main spray to insure uniform air impregnation. Moreover, the construction of the tip assembly enables the nozzles to be mounted in radial bores, and the tip readily adjusted or replaced to secure the most advantageous combination of pitch angle and angle of inclination for the various constructions and sizes of engine cylinders.

Obviously many modifications and variations of the invention, as hereinbefore set forth, may be made without departing from the spirit and scope thereof, and therefore only such limitations should be imposed as are indicated in the appended claims.

What I claim is:

1. In the operation of an internal combustion engine, wherein fuel is injected into rapidly swirling compressed air in the cylinder combustion space toward the latter part of the compression stroke, the first increment of injected fuel is spark-ignited less than 90° of swirling movement from the locus of injection and substantially as soon as combustible fuel vapor-air mixture is formed therefrom to establish a flame front traveling counter to the direction of air swirl, and the injection of fuel is continued into the swirling compressed air immediately in advance of the traveling flame front to progressively form additional combustible fuel vapor-air mixtures which are ignited by the traveling flame front and burned substantially as rapidly as formed; the improvement which comprises initiating injection of fuel on each cycle with at least two jets in slightly different angular relationships but in the same general horizontal direction on one side of a diameter of the combustion space, including a smaller non-flaring pencil type pilot jet directed in the direction of air swirl across a small chord of the combustion space adjacent the periphery thereof and close to the locus of spark ignition so that the first entering portion of the fuel from said pilot jet forms with the swirling air a localized portion of combustible fuel vapor-air mixture extending only a minor distance across a radius of the combustion space and which contacts the electrodes of the spark plug for immediate ignition to produce a flame, and at least one large flaring main jet of lower penetration directed in the direction of air swirl alongside of the pilot jet on the said one side of the combustion space but more toward the center thereof so as to substantially uniformly impregnate the swirling air across balance of the said radius at said one side of the combustion space and the resulting combustible fuel vapor-air mixture formed from the main jet is contiguous to the pilot jet mixture and flame, whereby the said flame spreads across the main jet mixture to establish the said flame front across said one side of the combustion space, and then continuing injection on said cycle with said pilot and main jets in advance of the established flame front to develop the power required, the said angular relationships of the said pilot and main jets being such as to insure ignition on each cycle and provide higher power with lower fuel consumption than is obtainable with a single jet directed so as to secure proper ignition.

2. The method according to claim 1, wherein the different angular relationships specified involves a larger angle between the jets in a plane extending across the combustion space at right angles to the cylinder axis, and a smaller angle between the jets in a plane parallel to the said cylinder axis.

3. The method according to claim 1, wherein both the pilot and main jets are also inclined upwardly so as to impinge on the cylinder head before reaching the locus of the flame front, the pilot jet being inclined upwardly at a larger angle than the main jet.

4. The method according to claim 1, wherein pilot injection is accomplished by two non-flaring jets directed from substantially the same locus of injection at the periphery of the combustion space across a small chord of the latter in the direction of air swirl and in substantially the same horizontal plane, but directed at different angles in a vertical plane so that at least one of the said pilot jets impinges on the cylinder head before reaching the locus of ignition, and the main injection is accomplished by at least one flaring jet directed from substantially the same locus of injection in the direction of air swirl and more toward the center of the combustion space.

5. In an internal combustion engine having a power cylinder and a piston operating therein providing a disc-shaped combustion space, the combination of means for imparting a high velocity of swirling movement to air within said cylinder combustion space, a fuel injection nozzle carried by said cylinder with a tip positioned adjacent the periphery of said combustion space, a spark plug carried by said cylinder with electrodes positioned less than 90° of swirling movement from said nozzle tip on the same side of said combustion space and adjacent the periphery thereof, said nozzle tip having a smaller diameter pilot port of larger length-to-diameter ratio directed to inject a directional non-flaring pilot jet in the direction of air swirl across a small chord of said combustion space and close to said spark plug electrodes so that combustible fuel vapor-air mixture formed from the first increment of injected fuel of said pilot jet contacts said electrodes, and at least one larger diameter main port of smaller length-to-diameter ratio on the same side of said tip and directed to inject a flaring main spray in the direction of air swirl at an angle to the said pilot spray into the said same side of a diameter of said combustion space alongside said pilot spray and contiguous thereto for uniformly impregnating the swirling air moving past said nozzle tip across a radius of said combustion space, means synchronized with engine operation for initiating injection of fuel on each cycle from said pilot port and at least said one main port toward the latter part of the compression stroke of said piston, and ignition means synchronized with engine operation for producing a spark of ignitible intensity at said electrodes promptly after the start of fuel injection and when said combustible mixture from the first increment of injected fuel of said pilot jet contacts said electrodes to produce a flame which then extends over the contiguous combustible mixture of the main jet to establish a flame front across said one side of the combustion space traveling counter to the direction of air swirl, said fuel injection nozzle then continuing injection from said pilot port and at least said one main port immediately in advance of said flame front on said cycle to develop increased power with lower fuel consumption than is obtainable with a nozzle having a single injection port.

6. An internal combustion engine according to claim 5, wherein said nozzle tip has a longitudinally extending bulbous portion beyond a pintle control valve, all said ports being formed in the same curving side of said bulbous portion and removed from the apex of said bulbous portion, the said pilot port being farther removed from the apex of said bulbous portion than said main port.

FREDERICK J. VILLFORTH, JR.

REFERENCES CITED

The following references are of record in the file of this patent:

UNITED STATES PATENTS

| Number | Name | Date |
|---|---|---|
| 1,525,156 | Teufl | Feb. 3, 1925 |
| 1,988,754 | Sleffel | Jan. 22, 1935 |
| 2,017,028 | Heinrich et al. | Oct. 8, 1935 |
| 2,058,487 | Mock | Oct. 27, 1936 |
| 2,125,293 | Hesselman | Aug. 2, 1938 |
| 2,165,176 | Fodor | July 4, 1939 |
| 2,213,928 | Gold et al. | Sept. 3, 1940 |
| 2,315,907 | Starr | Apr. 6, 1943 |
| 2,345,256 | Hedlund | Mar. 28, 1944 |
| 2,484,009 | Barber | Oct. 11, 1949 |

FOREIGN PATENTS

| Number | Country | Date |
|---|---|---|
| 153,551 | Great Britain | Mar. 29, 1920 |